United States Patent
Qu

(10) Patent No.: US 11,362,737 B2
(45) Date of Patent: *Jun. 14, 2022

(54) TERNARY MODULATION USING INTER-OPERABLE TRANSMITTERS AND RECEIVERS

(71) Applicant: Juniper Networks, Inc., Sunnyvale, CA (US)

(72) Inventor: Zhen Qu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/224,507

(22) Filed: Apr. 7, 2021

(65) Prior Publication Data

US 2021/0336704 A1    Oct. 28, 2021

Related U.S. Application Data

(63) Continuation of application No. 16/857,836, filed on Apr. 24, 2020, now Pat. No. 10,992,388.

(51) Int. Cl.
| | |
|---|---|
| *H04B 10/556* | (2013.01) |
| *H04B 10/25* | (2013.01) |
| *H04B 10/66* | (2013.01) |
| *H04L 1/00* | (2006.01) |

(52) U.S. Cl.
CPC ......... *H04B 10/5561* (2013.01); *H04B 10/25* (2013.01); *H04B 10/66* (2013.01); *H04L 1/0061* (2013.01)

(58) Field of Classification Search
CPC .................................................. H04B 10/5561
See application file for complete search history.

(56) References Cited

U.S. PATENT DOCUMENTS

| 9,130,679 | B1 * | 9/2015 | Ip ........................ H04B 10/524 |
| 10,992,388 | B1 * | 4/2021 | Qu ........................ H04B 10/25 |
| 2004/0085937 | A1 * | 5/2004 | Noda .................... H04L 1/0056 370/335 |
| 2013/0214949 | A1 | 8/2013 | Charlet et al. |
| 2020/0266888 | A1 * | 8/2020 | Koganei ............... H04L 1/0002 |

FOREIGN PATENT DOCUMENTS

| EP | 2843844 A1 | 3/2015 |
| JP | H114196 A | 1/1999 |
| JP | 2013168769 A | 8/2013 |

OTHER PUBLICATIONS

"U.S. Appl. No. 16/857,836, Non Final Office Action dated Dec. 14, 2020", 7 pgs.

(Continued)

*Primary Examiner* — Shi K Li
(74) *Attorney, Agent, or Firm* — Schwegman Lundberg & Woessner, P.A.

(57) ABSTRACT

A ternary phase shift keying transmitter and receiver can efficiently communicate using ternary encoded data that avoids indistinguishable transition curves for each of the three modulated states in the ternary encoded data. The transmitter is interoperable and can function with different types of receivers including direct detection-based receivers and coherent detection-based receivers.

20 Claims, 13 Drawing Sheets

(56) References Cited

OTHER PUBLICATIONS

"U.S. Appl. No. 16/857,836, Notice of Allowance dated Mar. 26, 2021", 5 pgs.
"U.S. Appl. No. 16/857,836, Response filed Mar. 15, 2021 to Non Final Office Action dated Dec. 14, 2020", 8 pgs.
"European Application Serial No. 20182299.6, Extended European Search Report dated Dec. 14, 2020", 5 pgs.
Schulte, P, et al., "Constant composition distribution matching", IEEE Trans. Inf. Theory, vol. 62, No. 1, (Jan. 2016), 730-434.

* cited by examiner

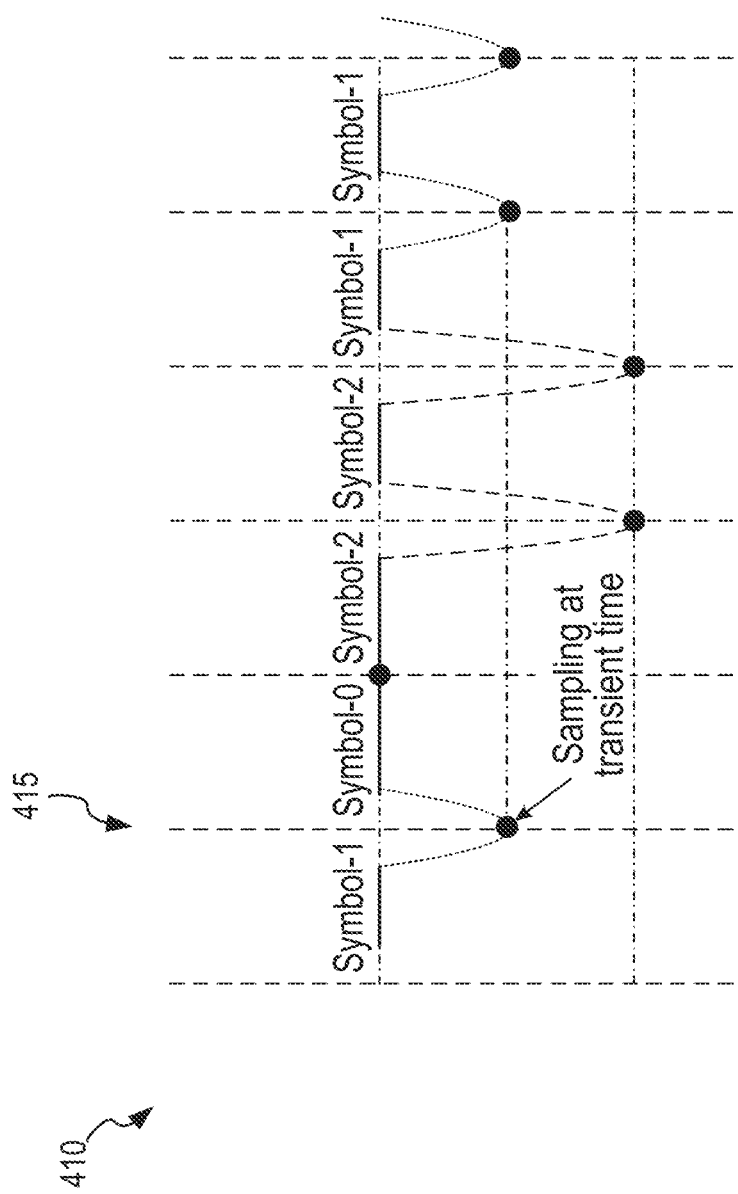

TERNARY MODULATION USING INTER-OPERABLE TRANSMITTERS AND RECEIVERS

PRIORITY

This application is a continuation of U.S. patent application Ser. No. 16/857,836, filed Apr. 24, 2020, which is incorporated by reference herein in its entirety.

TECHNICAL FIELD

The present disclosure generally relates to signal processing, and more particularly to sending and receiving data.

BACKGROUND

Intensity modulation and direction detection (IM/DD) is widely used in short-reach transmission systems. One type of IM/DD includes phase shift keying (PSK) in which the phase of the carrier wave is modulated with a signal to transmit data. Implementing different types of PSK on IM/DD systems is difficult because of noise, signal loss, and phase detection issues.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

FIGS. 4A and 4B show example sampling configurations, according to some example embodiments.

Figure 1:
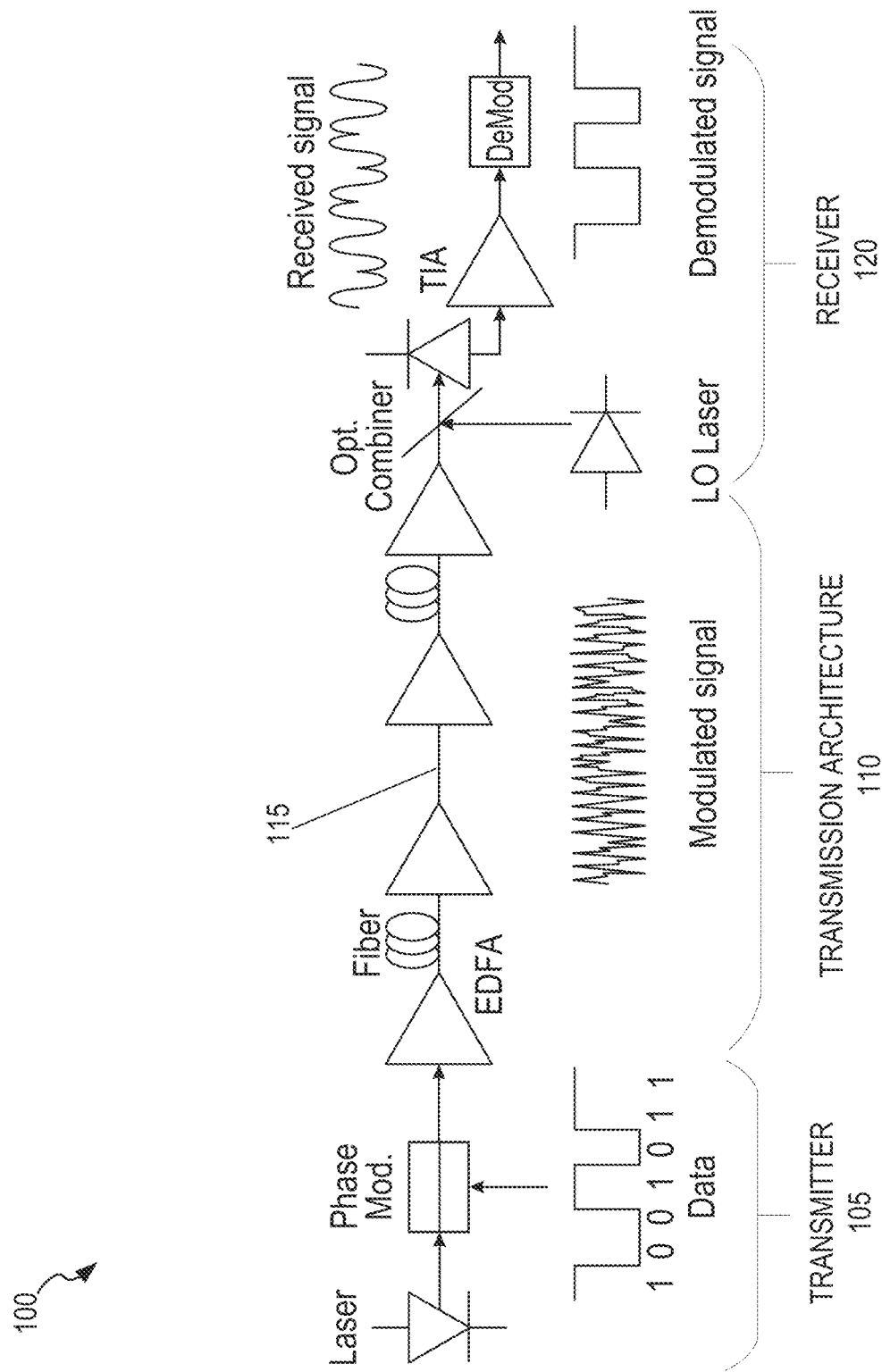
FIG. 1 shows an example architecture of a phase shift keying transmitter and receiver, according to some example embodiments.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

Generally, intensity modulation/direct detection is common in some short-reach transmission systems. One approach includes on-off keying (OOK), which is among the oldest modulation formats used in optical IM/DD systems that still remains popular due to its low implementation cost. However, the 1-bit carrying OOK format cannot meet the ever-increasing bandwidth requirement in today's information society. 4-level pause amplitude modulation (PAM4), which carries 2 bits per symbol, has been proposed and commercially implemented in intra/inter-data center networks. However, lots of optics manufacturers use a wait-and-see approach about the mass production of PAM4 transceivers, especially in the application of beyond 40 km reach. Accordingly, OOK cannot meet modern bandwidth requirements, coherent solution approaches are still too expensive to be commercially deployed in inter/intra-date center networks, and PAM4 solutions are not easily upgradable to coherent solutions in the future and thus may become out of date and impractical as technology evolves.

To this end, a ternary phase shift keying (TPSK) based optical communication system can be implemented to transmit and receive data in TPSK format. In some example embodiments, the binary data is converted into TPSK symbols using a distribution matcher to generate TPSK sequence data. The TPSK data can be mapped to a non-TPSK format that is easy to transmit over existing systems (e.g., existing binary systems). For example, the TPSK data is mapped to QPSK data using a phase mapping. Further, forward error correction can be implemented by converting the symbol data into binary data for forward error correction, then converting it back into the symbol data for transmission.

In some example embodiments, the data is transmitted over a single mode fiber to a receiver, which can use various detection schemes, such as direct or coherent detection, to detect the signal. The received signal data can be sampled at transient time between the symbol segments using an analog-to-digital converter and channel equalizer. The sampled QPSK symbol data can be converted into binary data for forward error correction decoded, and then mapped back TPSK data using the QPSK to TPSK phase mapping. Further, the receiver implements an inverse distribution matching module to recover and store the binary message data.

The TPSK-based optical communication system provides benefits over traditional OOK because it carries more bits per symbol than traditional OOK. Further, the TPSK-based optical communication system is easier to upgrade to coherent solutions than PAM4 while still being compatible with a traditional OOK-based system. Further, users implementing the system can select coherent detection and/or direct detection as per their requirements, so the proposed solution can meet the diverse market requirements. Additionally, the interoperable transmitter of the TPSK system can be readily adapted for use with newer detection schemes.

FIG. 1 shows an example architecture 100 of a phase shift keying transmitter and receiver, according to some example embodiments. In the transmitter 105, binary data can be modulated using phase modulation of an optical carrier (e.g., light). The modulated signal is then boosted using an amplifier (e.g., EDFA) and transmitted to the receiver over a transmission architecture 110, such as a network, in open air as radio waves, or an optical medium such as single mode fiber 115 (SMF) with several amplifiers. In the receiver 120, the received optical signal is recovered and translated back into the binary data for output.

Figure 2:
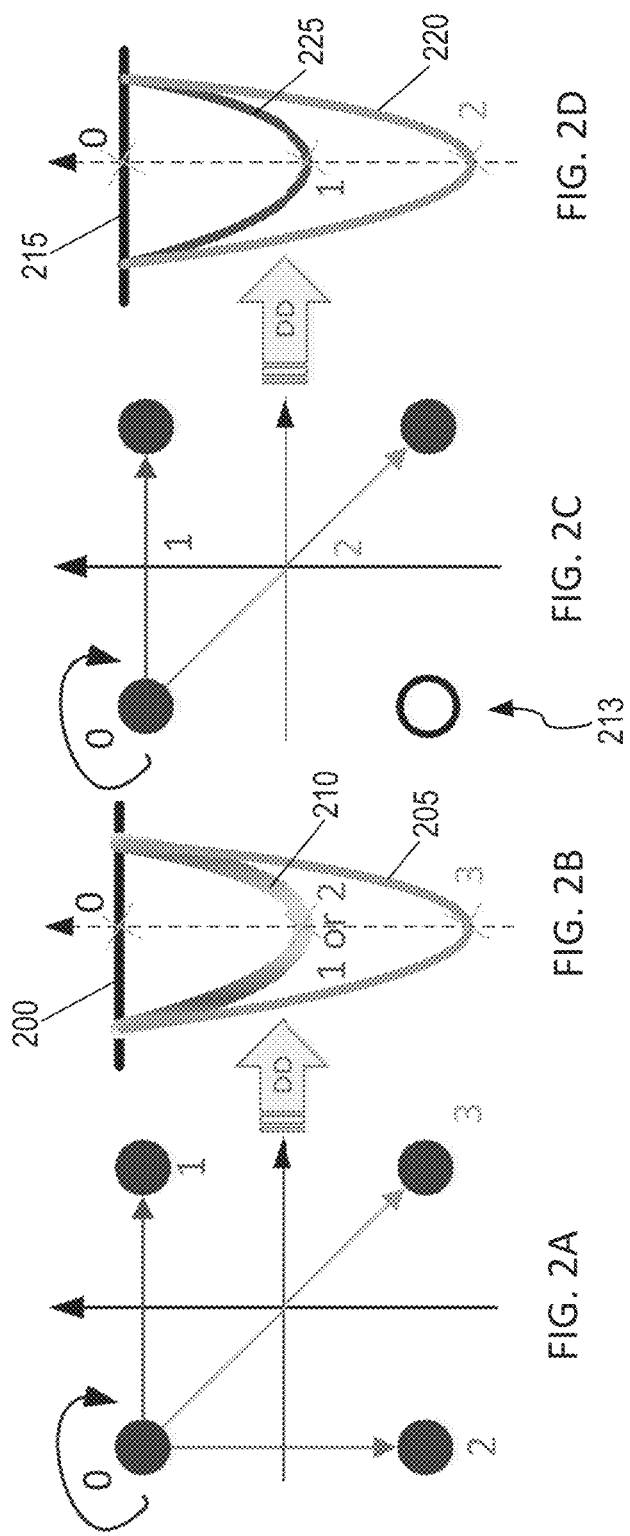
FIGS. 2A-2D show example ternary and quaternary constellation eyediagrams, according to some example embodiments.

FIGS. 2A-2D show example constellation and eyediagrams, according to some example embodiments. FIG. 2A displays a quaternary constellation diagram and FIG. 2B displays a quaternary eyediagram that corresponds to the quaternary constellation diagram of FIG. 2A. FIG. 2C displays a ternary constellation diagram and FIG. 2D displays a ternary eyediagram that corresponds to the ternary constellation diagram of FIG. 2C.

A constellation diagram (e.g., FIG. 2A, FIG. 2C) is a representation of a signal modulated by a digital modulation scheme (e.g., quadrature amplitude-based modulation, quaternary phase-shift keying, ternary phase shift keying, and so on). Constellation diagrams display the signal as a two-dimensional XY-plane scatter diagram in the complex plane at symbol sampling instants. The angle of a point, measured counterclockwise from the horizontal axis, represents the phase shift of the carrier wave from a reference phase. The distance of a point from the origin represents a measure of the amplitude or power of the signal.

An eyediagram (e.g., FIG. 2B, FIG. 2D) is an example signal detection display (e.g., oscilloscope display) in which a signal from a receiver is repetitively sampled and applied to the vertical input, while the data rate is used to trigger the horizontal sweep.

In the constellation diagram of FIG. 2A, the four symbols (e.g., modes, states) of the quaternary scheme include "0", "1", "2", and "3", each of which corresponds to a phase and amplitude for the given symbol. As discussed, if quaternary modulation is implemented, phase loss can occur and some transitions between the symbols will become indistinguishable from one another.

For example, in FIG. 2A, the transition from symbol "0" to "0" corresponds to a curve 200 in the eyediagram of FIG. 2B, which is distinguishable from the other curves in FIG. 2B. Further, again with reference to FIG. 2A, the transition from "0" to "3" corresponds to a curve 205 in the eyediagram of FIG. 2B, which is again distinguishable from the other curves in FIG. 2B.

However, when using direct detection, some quaternary scheme transitions will be degenerate in that they are indistinguishable from one another and have approximately the same transition curve in the detected displays (e.g., eyediagram of FIG. 2B). In particular, for example, in FIG. 2A, the transition from "0" to "1" and the transition from "0" to "2" both result in curve 210 in the eyediagram of FIG. 2B. Thus, as the two are indistinguishable, systemic errors will occur in of the QPSK data when transmitted and received (e.g., using direct detection).

To this end, a ternary phase shift keying scheme can be implemented to avoid indistinguishable phases and errors. In particular, as illustrated in the constellation diagram in FIG. 2C, a ternary phase shift keying scheme includes three symbols (modes) including "0", "1", and "2"; however, no mode is implemented in the bottom left had quadrant (as denoted by the non-solid circle 213 in FIG. 2C), thereby avoiding degenerate phases.

For example, in FIG. 2C, the transition from symbol "0" to "0" corresponds to a curve 215 in the eyediagram of FIG. 2D, which is distinguishable from the other curves in FIG. 2D. Further, again with reference to FIG. 2C, the transition from "0" to "2" corresponds to curve 220 in the eyediagram of FIG. 2D, and the transition from "0" to 1" (in FIG. 2C) corresponds to curve 225 (in FIG. 2D). As illustrated in FIG. 2D, no transitions overlap and thus they can be distinguished (e.g., when transitions are detected using direct detection), and thereby properly decoded without systemic error.

Figure 3:
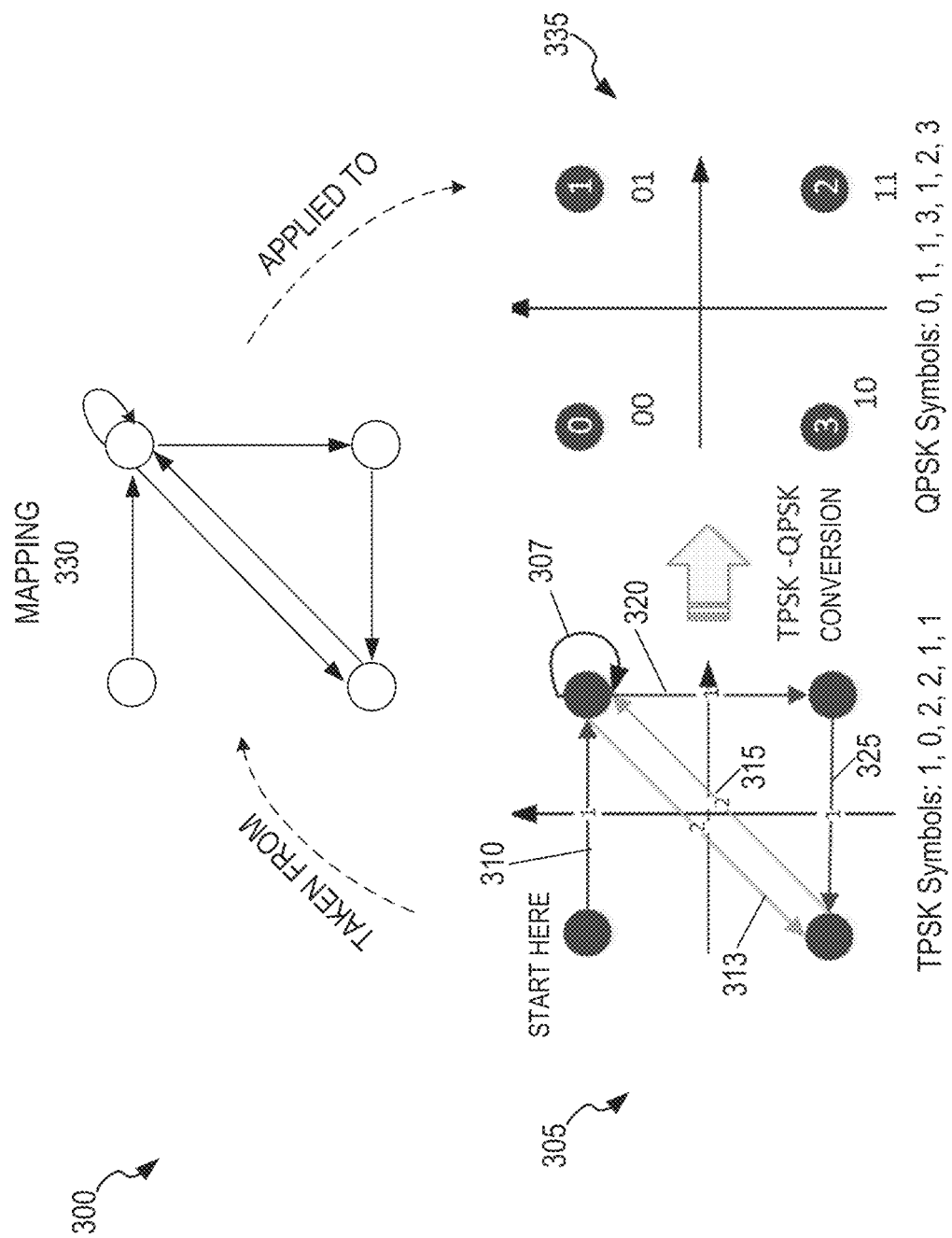
FIG. 3 shows a mapping architecture for converting TPSK for transmission, according to some example embodiments.

FIG. 3 shows a mapping architecture 300 for converting TPSK to a non-TPSK format (e.g., QPSK, binary PSK, additional higher order PSK formats) for transmission, according to some example embodiments. As discussed with reference to FIG. 2A-2D above, implementing TPSK can avoid errors by using curves that are distinguishable by the receiver detector (e.g., in direct detection, a fast photo diode). To facilitate transmission of TPSK-encoded data over existing networks (e.g., binary networks configured to transmit data in 1's and 0's), the TPSK data is converted to QPSK data for transmission and then converted back into TPSK at the receiver, in accordance with some example embodiments.

The example displayed in FIG. 3 shows example mapping from TPSK to QPSK for transmission, where the reverse mapping process can then be used at the receiver to convert received QPSK data back into TPSK data for further processing (e.g., sampling, ternary based decoding).

As illustrated, the eyediagram 305 displays a ternary encoding scheme for TPSK symbols. In the example, the TPSK symbols—1, 0, 2, 2, 1, 1—create curve mappings on the diagram 305, where "0" corresponds to no change and no turning (e.g., can be displayed as a loop back to the same symbol), "1" corresponds to turning 90 degrees clockwise, and "2" corresponds to turning 180 degrees clockwise.

In the illustrated example, starting from the top left symbol ("START HERE"), the first TPSK symbol is "1," (from the TPSK symbols) which is a 90-degree turn to the top-right point (corresponding to mapping arrow 310). The second TPSK symbol is "0", which is a repeat symbol back to the top-right point (corresponding to mapping arrow 307). The third TPSK symbol is "2," which is a 180-degree turn to the bottom left symbol (corresponding to mapping arrow 313). The third symbol is another 2, which is another 180-degree turn back to the top right symbol (corresponding to mapping arrow 315). The fourth symbol is a "1," which is a 90-degree turn from the top right symbol to the bottom right symbol (corresponding to mapping arrow 320). The fifth symbol is another "1," which is a 90-degree turn from the bottom right to bottom left symbol (corresponding to mapping arrow 325).

To generate the QPSK symbols, the mapping 330 from the TPSK symbol sequence is then applied to the QPSK constellation diagram 335, in which the top left symbol is "0", the top right symbol is "1", the bottom right symbol is "2" and the bottom left symbol is "3". That is, in particular, the mapping 330 starts from the top left symbol so the QPSK symbols start with "0", followed by "1", followed by a repeat "1" due to the looped curve 307, and so on.

In the example of FIG. 3, the starting point is the top left symbol, which generates a starting "0" in the QPSK symbol sequence. However, it is not necessary to always start from the top-left symbol; any point can be used. For the decoding purpose (e.g., at the receiver), there can be an indicator (e.g., stored in memory or decoding instructions) to show where the symbols start from. Therefore, if starting from 0, the QPSK symbols will lead with a 0; if starting from 2, the QPSK symbols will lead with a 2, and so on.

Additionally, the TPSK symbols can be converted to other formats, other than QPSK (e.g., binary PSK (BPSK)), for transmission across a network, according to some example embodiments. That is, for example, a higher order PSK format having 8 states or modes can be mapped to (from TPSK) using different phase shifts per TPSK symbol. For instance, while the above example for QPSK uses no turn for "0", 90 degree turn for "1", and 180 degree turn for "2", the amount of turn per TPSK signal can be customized to work for higher order PSK schemes (e.g., an 8 mode scheme) by turning by different amounts per TPSK symbol (e.g., 20 digress for "0", 100 degree turn for "1" and 270 degree turn "2" of the TPSK signals), such that the mapping created maps TPSK to different modes of the higher order PSK scheme, or lower order scheme (e.g., BPSK), according to some example embodiments.

Figure 4A:
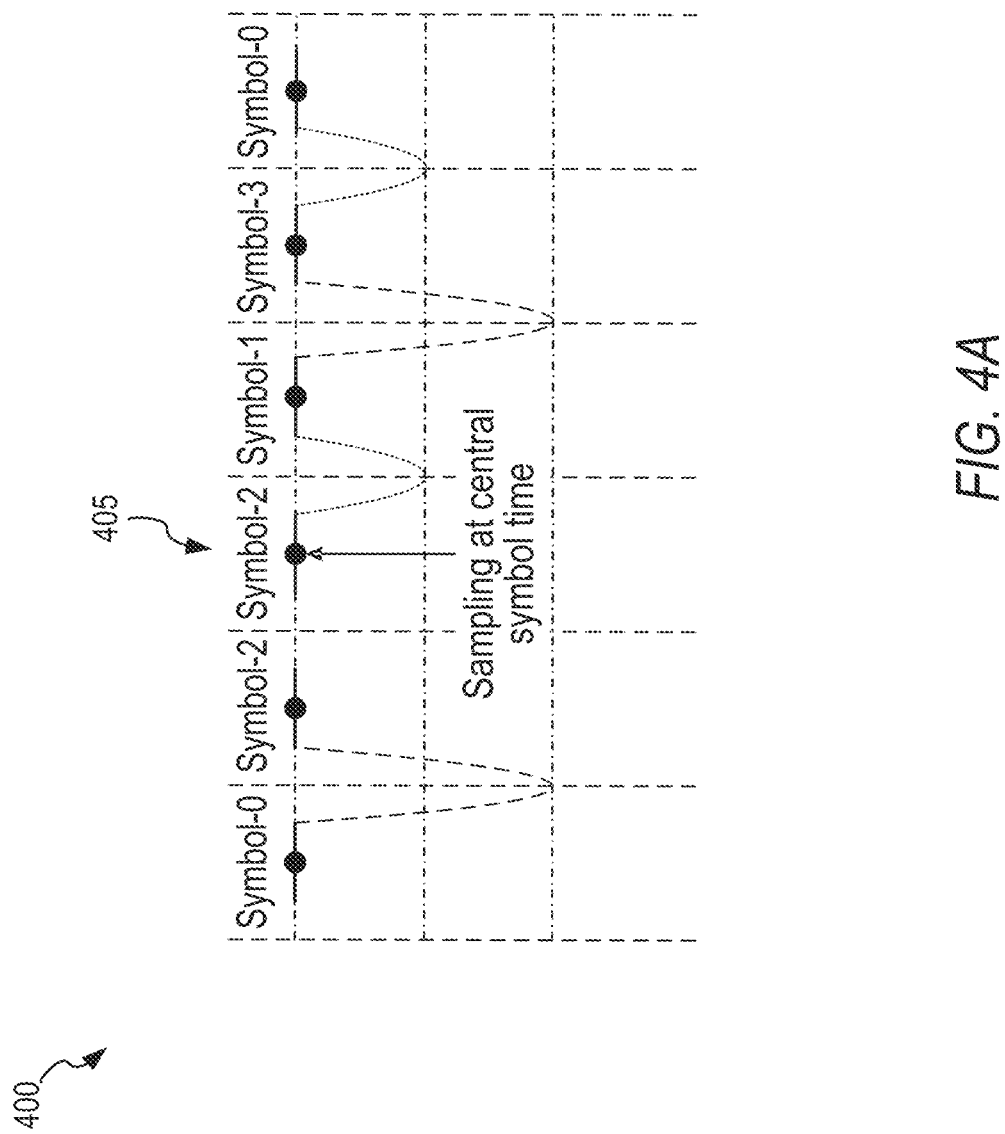

FIGS. 4A and 4B show example sampling configurations, according to some example embodiments. Generally, QPSK symbols can only be detected by coherent detection, where symbol sampling occurs at the center of symbol time as non-center sampling locations incur signal-to-noise ratio issues. However, sampling at center symbol time using the TPSK scheme can result in loss in information. For example, in the sampling graph 400 of FIG. 4A, the center sampled point 405 may miss the data to be detected. In contrast, as shown in FIG. 4B, in sampling graph 410, the sampling of ternary data is implemented at transient time (e.g., transition points between symbols), and each signal can be sampled for the TPSK data as illustrated by sampling point 415.

Figure 5:
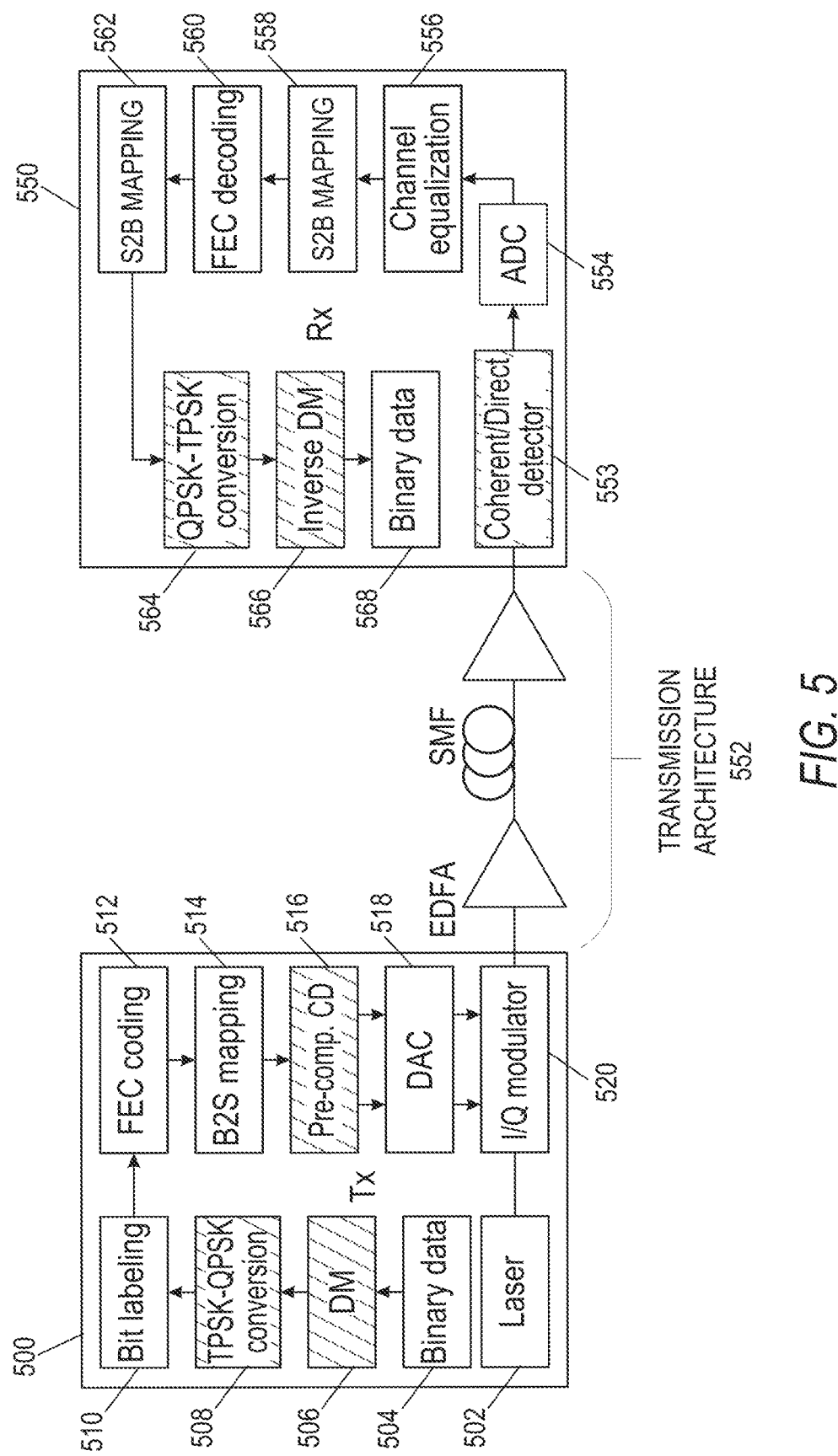
FIG. 5 shows an example transmitter and receiver, according to some example embodiments.

FIG. 5 shows an example transmitter 500 and receiver 550, according to some example embodiments. In the example of FIG. 5, the components of the transmitter 500 and receiver can be implemented using software (applications, non-transitory instructions stored in memory), hardware (e.g., servers, switches), electrical devices (e.g., chips, control circuitry, an Field Programmable Gate Array), optical devices (e.g., lasers, fiber cables, photodiodes) and combinations thereof. In the transmitter 500, one or more light sources, such as laser 502, can generate binary data 504. In some example embodiments, the binary data 504 is not generated by the light sources, but is rather received from an external source not depicted in FIG. 5, such as a fiber from another component, or may be identified as binary data stored in memory and ready for transmission via the transmitter 500.

The binary data 504 is input into a distribution matcher 506 (e.g., a constant composition distribution (CCDM) based distribution matcher), which is configured to efficiently convert binary data to a symbol sequence following any entropy, including for example a ternary symbol scheme (e.g., three symbols: 1, 2, 3). The distribution matcher 506 (DM) encodes a binary input data sequence into a sequence of symbols (codewords), with desired target probability distribution. In some example embodiments, the distribution matcher 506 uses a CCDM version of distribution matching to map the binary data 504 to 0, 1, 2 ternary symbols, where each symbol is generated with equal probability (⅓). In some example embodiments, it is not necessary to generate each of the three symbols with equal likelihood. For example, the distribution matcher 506 can implement an exponential distribution to generate a more power-efficient modulation format, according to some example embodiments. The set of the output codewords constitutes a codebook (or code) of the DM 506. Further, constant-composition DM (CCDM) uses arithmetic coding to efficiently encode data into codewords from a constant-composition (CC) codebook, which can be implemented to decode the symbols back into binary data using inverse distribution matcher 566 in the receiver 550.

The TPSK data from the distribution matcher 506 is then input into the TPSK-QPSK converter 508, which converts the TPSK symbol data into QPSK symbol data, as discussed above with reference to FIG. 3.

The QPSK symbols output by the TPSK-QPSK converter 508 are then converted into bits using a bit labeling module 510. For example, with reference to the constellation diagram 335 in FIG. 3, if the QPSK symbol is "1," it is converted into binary "01" by the bit labeling module 510.

The bit data is then input into forward error correction (FEC) coding module 512 for error correction processing. Generally, forward error correction is a technique used for controlling errors in data transmission over unreliable or noisy communication channels. In FEC, the transmitter encodes the message in a redundant way, most often by using an error-correcting code (ECC). The redundancy allows the receiver to detect a number of errors that may occur anywhere in the message (e.g., errors accumulated while in transit), and often to correct these errors without re-transmission.

FEC enables the receiver the ability to correct errors without needing a reverse channel to request re-transmission of data. In some example embodiments, non-binary FEC is implemented; however, non-binary FEC is complex and can be difficult to implement. In the illustrated embodiment, the QPSK data has already been converted into binary data and thus a binary FEC scheme can be beneficially implemented by the transmitter 500 and receiver 550. The FEC coding module 512 outputs binary data, which is then input into binary-to-symbol (B2S) mapping module 514 for conversion back into QPSK symbols.

The data is then input into a pre-compiler CD 516 for processing, followed by a digital-to-analog converter 518 (DAC), which then converts the data into analog data, which is then transmitted via I/Q modulator 520 using laser 502.

The data is transmitted from the transmitter 500 to the receiver 550 over transmission architecture 552, such as a single mode fiber (SMF) and one or more amplifiers (e.g., erbium-doped fiber amplifier (EDFA)) to boost the signal along the way.

At the receiver 550, a detector 553 receives the data from the transmission architecture 552 (e.g., as analog signal). Notably, the detector 553 can be a direct detection (DD)-based detector or coherent detection-based detector, either of which will work with transmitter 500 without requiring a matching transmitter type, as discussed in further detail below with reference to FIGS. 6-9.

The detector 553 outputs the analog data into an analog-to-digital converter (ADC) 554, which initially samples the analog data, and then the optimal transient points are obtained by re-sampling algorithms using the channel equalizer 556 to generate QPSK data. The data is then converted from QPSK symbols into binary data by symbol-to-binary (S2B) mapping module 558 for binary-based error correction using the FEC decoding module 560. The FEC decoding module 560 performs binary-based error correction decoding, and then outputs the binary data into S2B mapping module 562. The binary data is then converted into QPSK symbols by the S2B mapping module 562 and then converted into TPSK symbols using QPSK-TPSK converter 564. For example, the QPSK-TPSK converter 564 uses the reverse of the process discussed with reference to FIG. 3 above (e.g., mapping QPSK curves to TPSK data). The TPSK symbols are output by the QPSK-TPSK converter 564, and then converted from ternary symbols into binary data using an inverse distribution matcher 566 discussed above, which then outputs binary data 568 for further process or storage (e.g., in memory).

One benefit of the TPSK scheme of FIG. 5 is that the transmitter (e.g., transmitter 500) is interoperable with different types of receivers. This enables a single transmitter to function with the current state of the art (e.g., direct detection systems) and advances to such systems, such as coherent detection systems, which rolled out while requiring minimal or no changes to the TPSK transmitters. FIGS. 6-10 show examples of interoperable transmitter and receiver configurations, according to some example embodiments.

Figure 6:
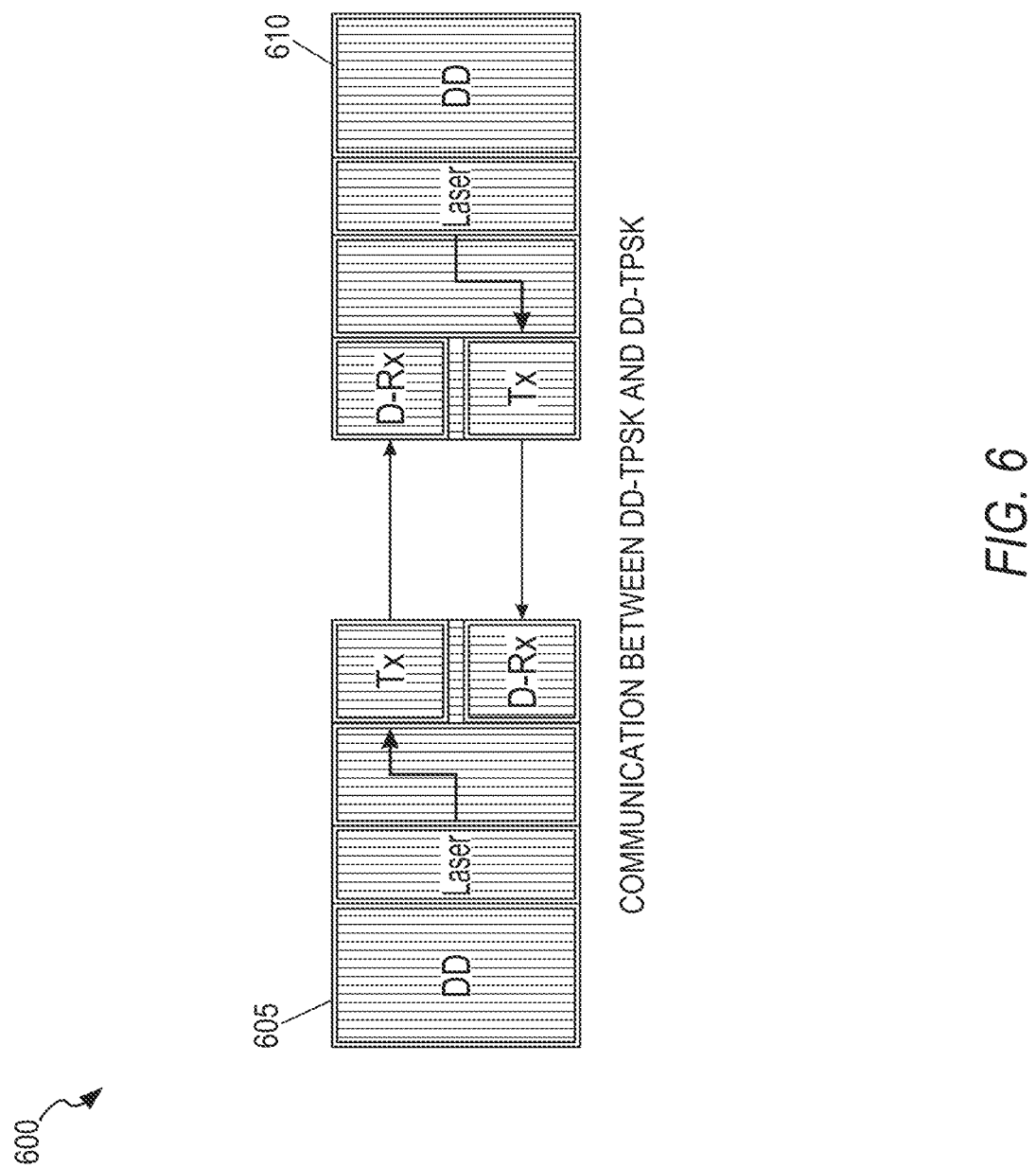
FIG. 6 shows an example direct detection TPSK communication architecture, according to some example embodiments.

FIG. 6 shows an example direct detection (DD) TPSK communication architecture 600, according to some example embodiments. In the illustrated example, the TPSK transceiver 605 and TPSK transceiver 610 both include a TPSK transmitter (Tx), such as transmitter 500. Further, each of TPSK transceivers 605 and 610 includes direct detection-based receivers (D-Rx). For example, both of the both of TPSK transceivers 605 and 610 include a direct detection version of detector 553 in FIG. 6.

Figure 7:
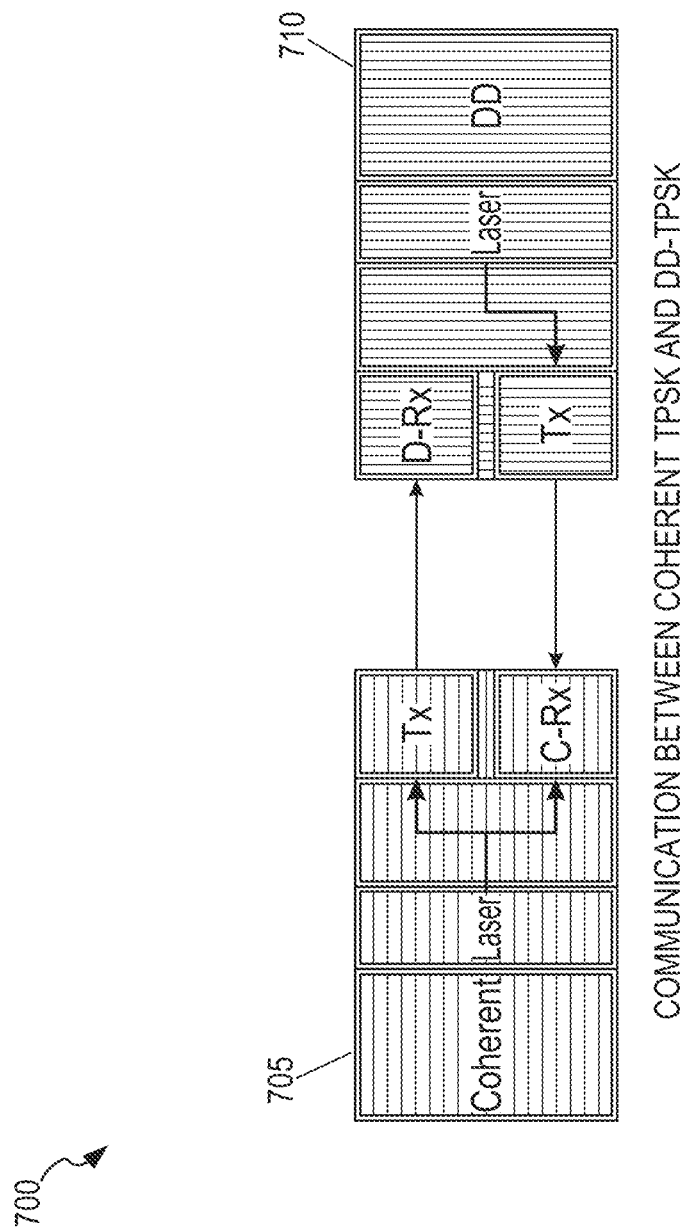
FIG. 7 shows an example hybrid TPSK communication architecture, according to some example embodiments.

FIG. 7 shows an example hybrid TPSK communication architecture 700, according to some example embodiments. In the illustrated example, the TPSK transceiver 705 and TPSK transceiver 710 both include a TPSK transmitter (Tx), such as transmitter 500. However, the transceivers 705, 710 have different types of receiver modules. For example, the transceiver 705 may have upgraded to a coherent detection-based receiver (C-Rx), while the transceiver 710 retains its detection-based receiver (D-Rx). However, due to the interoperable TPSK architecture (e.g., transmitter 500 of FIG. 5), the transceiver 710 does not need to modify its transmitter to work with the coherent detection-based receiver of transceiver 705 and can use its same transmitter with any other TPSK-based receiver, whether it is a direct detection-based receiver or coherent detection-based receiver.

Figure 8:
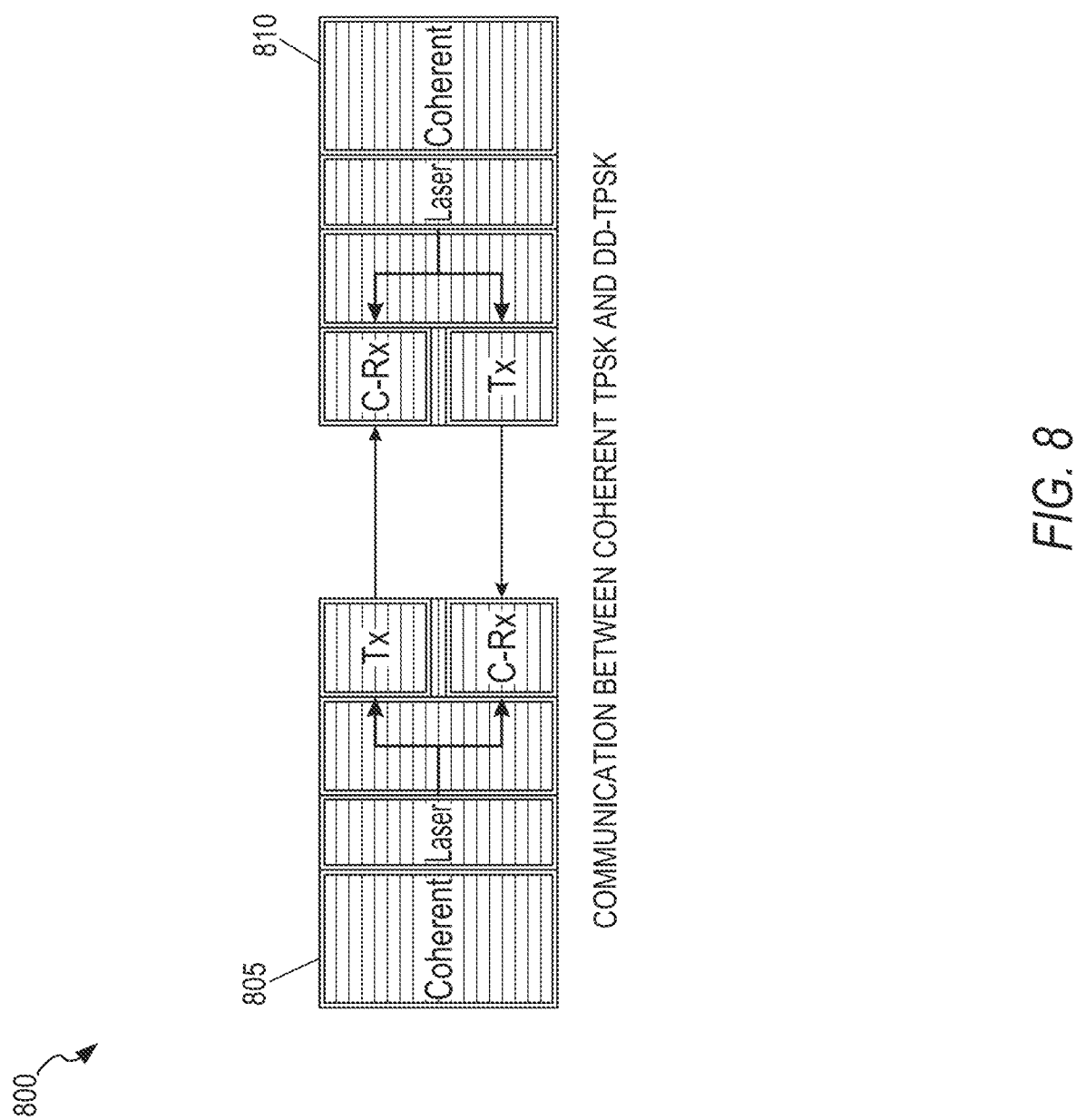
FIG. 8 shows an example coherent detection based TPSK communication architecture, according to some example embodiments.

FIG. 8 shows an example coherent detection based TPSK communication architecture 800, according to some example embodiments. In the illustrated example, the TPSK transceiver 805 and TPSK transceiver 810 both include a TPSK transmitter (Tx), such as transmitter 500. Further, the transceivers 805, 810 have the same type of receivers, i.e., coherent-based receivers (e.g., C-Rx). For example, both transceivers 805, 810 have upgraded to coherent detection-based detectors in their receiver modules. Further, while coherent detection-based receivers are discussed as an example of an upgraded receiver, the architecture of TPSK transmitter (e.g., transmitter 500) removes the emphasis on receiver type, thereby allowing future receiver types to be integrated into the TPSK architecture to allow future upgradeability.

Figure 9:
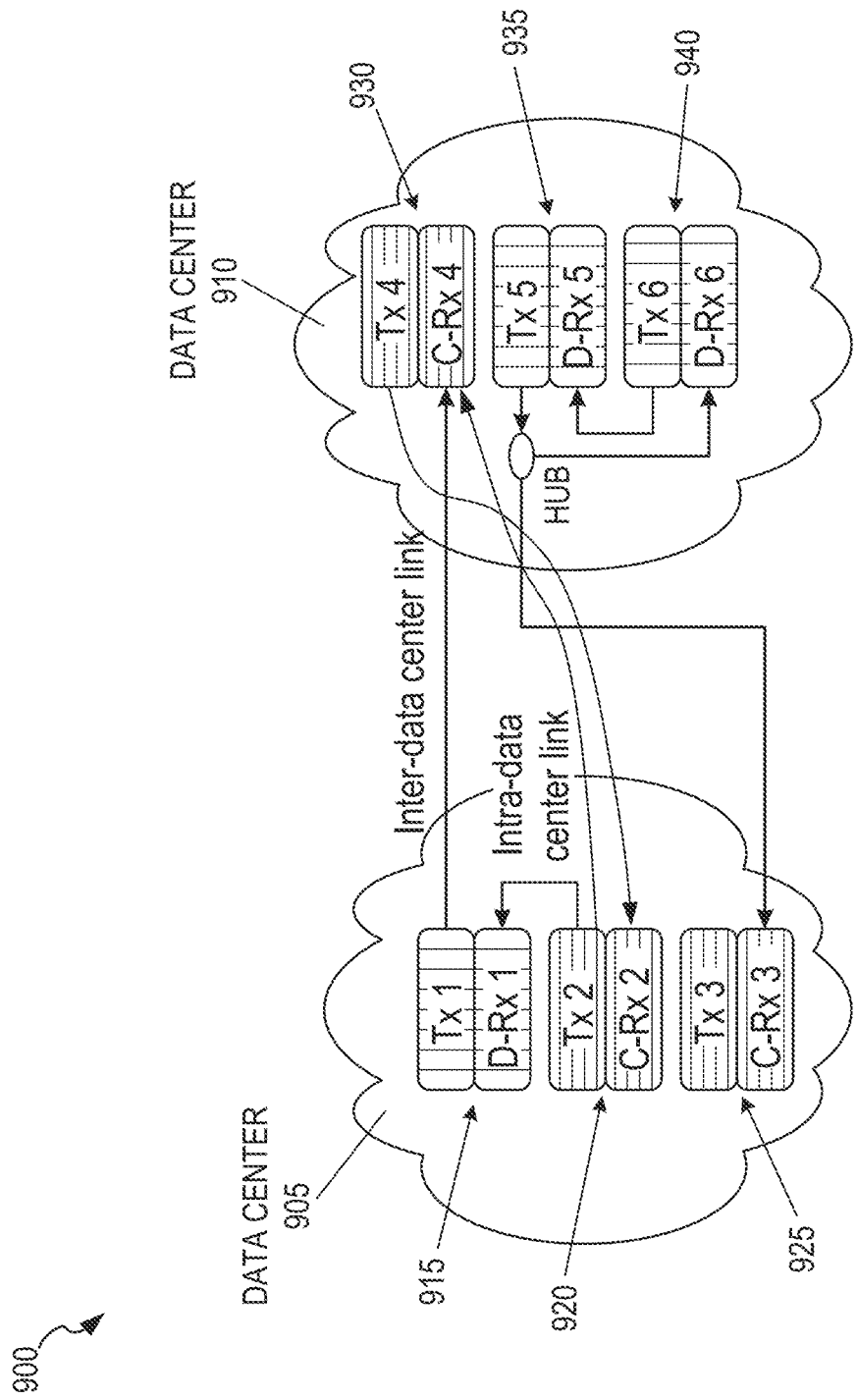
FIG. 9 shows an example TPSK data center architecture, according to some example embodiments.

FIG. 9 shows an example TPSK data center architecture 900, according to some example embodiments. As illustrated, data center 905 comprises TPSK transceiver 915, TPSK transceiver 920, and TPSK transceiver 925. Data center 910 is a separate data center (e.g., a data center at a different geographic location) and comprises TPSK transceiver 930, TPSK transceiver 935, and TPSK transceiver 940. Each data center 905, 910 can use its TPSK transceivers to communicate data with other transceivers, each of which may have different receiver types (e.g., direct detection, coherent detection, etc.) but can still implement the same interoperable TPSK transmitter. For example, TPSK transceiver 930 can use its TPSK transmitter (Tx 4) to send TPSK data (e.g., TPSK data in non-TPSK format) to the coherent detection-based receiver (C-Rx 2) in transceiver 920. Similarly, TPSK transceiver 920 uses its interoperable TPSK transmitter (Tx 2) to send data to a direct detection-based receiver (D-Rx 1) in the TPSK transceiver 915, which is located in the same data center 905; further, TPSK transceiver 920 can also use its same TPSK transmitter (Tx 2) to send an inter-data center link communication to transceiver 930, which receives the data using a coherent detection-based receiver (C-Rx 4). Thus, as illustrated, not all receivers need be of the same exact type; different receiver types can be used, and they can be upgraded at different points in time and still receive the TPSK data in an efficient and robust manner.

Figure 10:
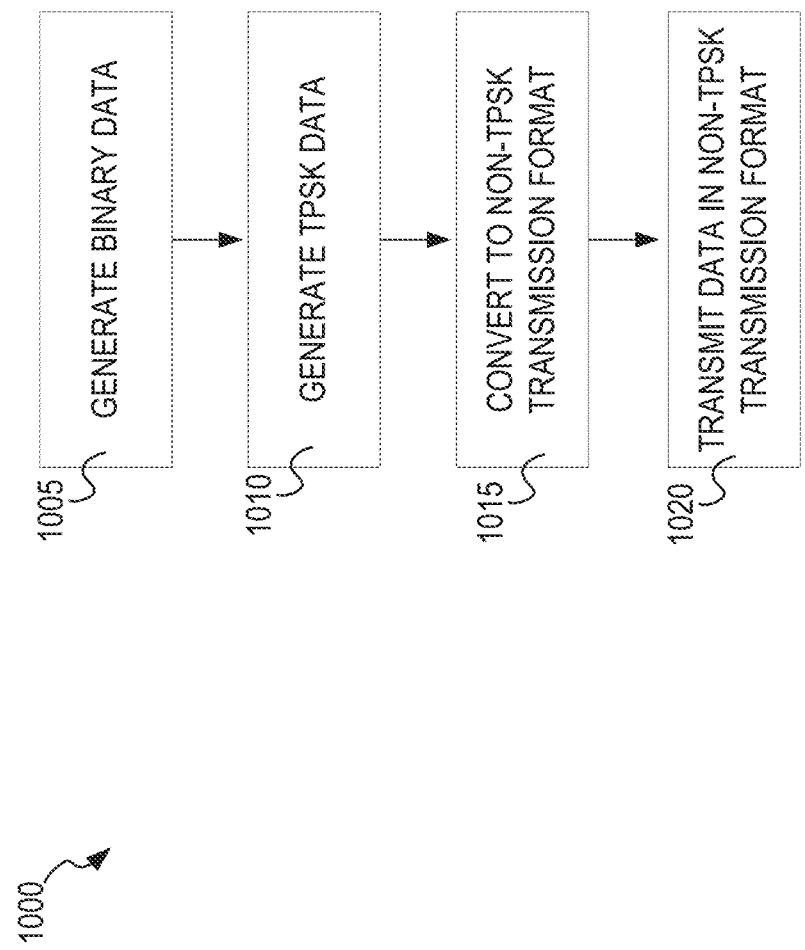
FIG. 10 shows a flow diagram of an example method for implementing a TPSK transmitter, according to some example embodiments.

FIG. 10 shows a flow diagram of an example method 1000 for implementing a TPSK transmitter (e.g., transmitter 500), according to some example embodiments. At operation 1005, the TPSK transmitter 500 generates binary data. For example, the TPSK transmitter 500 generates binary data using a light source. According to some alternative embodiments, the data may be identified instead of generated at operation 1005. That is, for example, the binary data has already been generated and is stored in memory of the transmitter ready for encoding and transmission.

At operation 1010, the TPSK transmitter 500 generates TPSK data. For example, the TPSK transmitter 500 uses a distribution matcher to convert the binary data into ternary symbols, e.g., 0, 1, 2, using an equal distribution likelihood.

At operation 1015, the TPSK transmitter 500 converts the TPSK data to transmission format. For example, the TPSK transmitter 500 maps the TPSK symbol sequence into a non-TPSK format, such as a QPSK symbol sequence, as discussed above. Additionally, and in accordance with some example embodiments, the generated QPSK symbols are then converted into bits for FEC coding, and then converted back into QPSK for transmission.

At operation 1020, the TPSK transmitter 500 transmits non-TPSK data to its destination. For example, the TPSK transmitter 500 transmits the data in the non-TPSK format to the receiver 550 over a single mode fiber boosted by one or more amplifiers.

Figure 11:
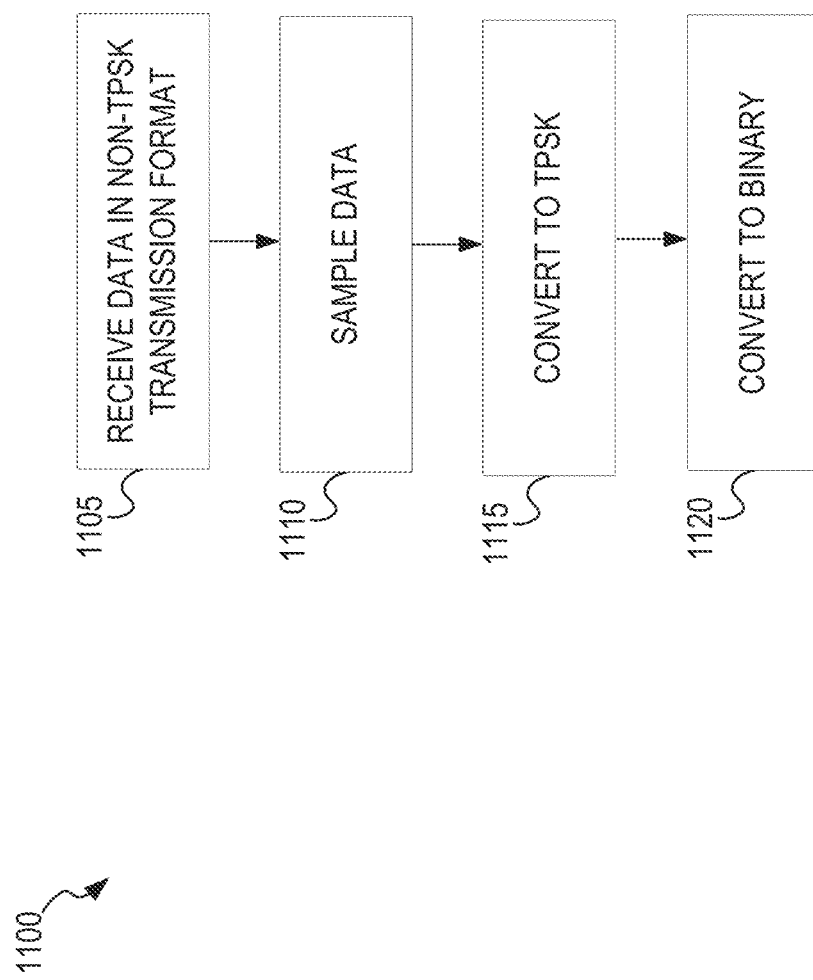
FIG. 11 shows a flow diagram of an example method for implementing a TPSK receiver, according to some example embodiments.

FIG. 11 shows a flow diagram of an example method 1100 for implementing a TPSK-based receiver, according to some example embodiments.

At operation 1105, the TPSK receiver 550 receives data in the non-TPSK format. For example, the TPSK receiver 550 uses direct detection-based system to receive the data. Alternatively, the TPSK receiver 550 uses a coherent detection-based receiver or other types of receiver detectors, such as antennas, to receive the data.

At operation 1110, the TPSK receiver 550 samples the received data at transient time. For example, the data is received as an analog signal, which is then first sampled by an analog-to-digital converter (ADC). Then the optimal transient points are obtained by implementing re-sampling in the channel equalization module in the receiver.

At operation 1115, the TPSK receiver 550 converts the sampled non-TPSK data to TPSK data. For example, the non-TPSK sampled data can be data in the QPSK format. The QPSK data is then converted into binary data to undergo binary FEC decoding and is then converted back into the QPSK data. After binary-based error correction, the QPSK data is then converted into TPSK data using a phase mapping as discussed in FIG. 3 above. For example, the QPSK data sequence curves are mapped to a TPSK constellation diagram to generate the TPSK data.

At operation 1120, the TPSK receiver 550 converts the TPSK data into binary data. For example, the TPSK receiver 550 implements an inverse distribution matcher using the same codebook as the distribution matcher in the transmitter 500 to convert the TPSK symbols into binary data.

Figure 12:
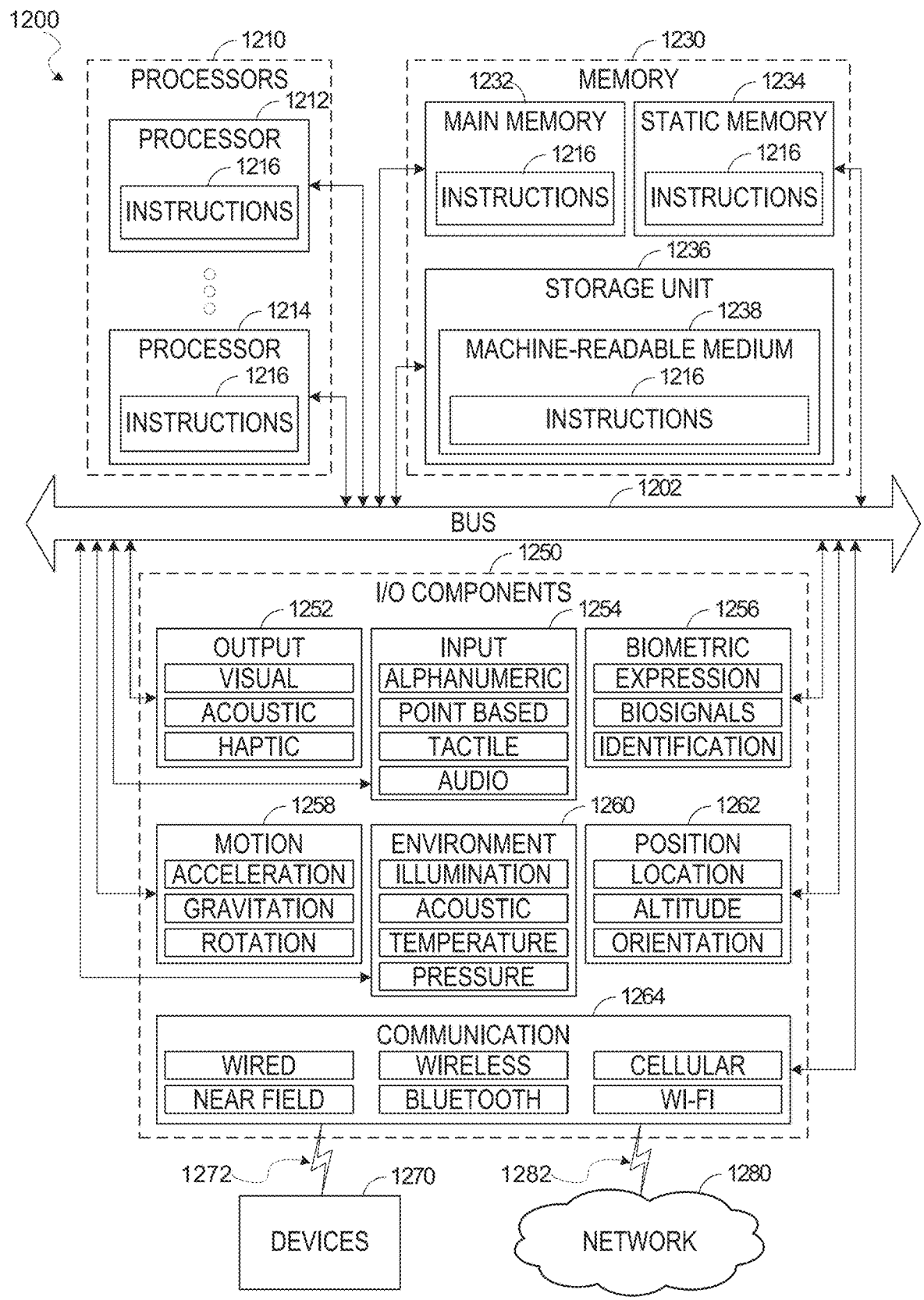
FIG. 12 shows an example system for implementing a ternary data scheme, according to some example embodiments.

FIG. 12 illustrates a diagrammatic representation of a machine 1200 in the form of a computer system within which a set of instructions may be executed for causing the machine to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the method 1000 of FIG. 10 (as a transmitter) and/or execute the 1100 of FIG. 11 (as a receiver). Additionally, or alternatively, the instructions 1216 may implement the transmitter 500 or the receiver 550 in FIG. 5, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236, both accessible to the processors 1210 such as via the bus 1202. The main memory 1230, the static memory 1234, and storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

The various memories (i.e., 1230, 1232, 1234, and/or memory of the processor(s) 1210) and/or storage unit 1236 may store one or more sets of instructions and data structures (e.g., software) embodying or utilized by any one or more of the methodologies or functions described herein. These instructions (e.g., the instructions 1216), when executed by processor(s) 1210, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), Field Programmable Gate Array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a VPN, a LAN, a WLAN, a WAN, a WWAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of well-known transfer protocols (e.g., hypertext transfer protocol (HTTP)). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The following are example embodiments:

Example 1. A method for processing optical data using a phase shift key (PSK) transmitter comprising: identifying binary data for transmission; generating ternary modulated data from the binary data, the ternary modulated data being in a ternary PSK format comprising three modulation states; generating, from the ternary modulated data, non-ternary modulated data for transmission to a receiver, the non-ternary modulated data being in a non-ternary PSK format that comprises more than three modulation states; and transmitting, to the receiver, the non-ternary modulated data as light using an optical source.

Example 2. The method of example 1, wherein converting the ternary modulated data to the non-ternary modulated data comprises using a phase mapping to map the ternary PSK format to the non-ternary PSK format.

Example 3. The method of any one of examples 1 to 2, wherein the non-ternary PSK format is a quaternary PSK format comprising four modulation states.

Example 4. The method of any one of examples 1-3, wherein the receiver is a direct detection based receiver that receives the light comprising the non-ternary modulated data.

Example 5. The method of any one of examples 1-4, wherein the receiver is a coherent detection based receiver that receives the light comprising the non-ternary modulated data.

Example 6. The method of any one of examples 1-5, wherein the receiver is configured to sample the received light at transient time, the sampling at transient time being performed by an analog-to-digital converter in the receiver.

Example 7. The method of any one of examples 1-6, wherein transient time corresponds to points between symbol segments of the received light.

Example 8. The method of any one of examples 1-7, further comprising: converting the non-ternary modulated data into light using the optical source, wherein the light is transmitted to the receiver using a fiber.

Example 9. The method of any one of examples 1-8, wherein the fiber is a single mode fiber.

Example 10. The method of any one of examples 1-9, wherein the non-ternary modulated data is converted to analog data using a digital-to-analog converter.

Example 11. The method of any one of examples 1-10, wherein the ternary modulated data is generated from the binary data using a distribution matcher.

Example 12. The method of any one of examples 1-11, wherein the distribution matcher is a constant composition distribution matcher.

Example 13. The method of any one of examples 1-12, wherein the receiver is configured to convert the light into ternary modulated data and convert the ternary modulated data into the binary data using an inverse distribution matcher.

Example 14. The method of any one of examples 1-13, further comprising: converting the non-ternary modulated data into binary data; generating forward error correction (FEC) binary data by applying FEC coding to the binary data; and converting the forward error correction binary data into the non-ternary modulated data.

Example 15. The method of any one of examples 1-14, wherein the receiver is configured to convert the received non-ternary data into binary data and apply FEC decoding to the binary data.

Example 16. The method of any one of examples 1-15, wherein each of the three modulated states of the ternary PSK format has non-overlapping transition curves when detected by a detector in the receiver.

Example 17. The method of any one of examples 1-16, wherein the receiver is geographically remote from the transmitter.

Example 18. A phase shift key (PSK) transmitter comprising: one or more processors; an optical source; and a memory storing instructions that, when executed by the one or more processors, cause the PSK transmitter to perform operations comprising: identify binary data for transmission; generate ternary modulated data from the binary data, the ternary modulated data being in a ternary PSK format comprising three modulation states; generate, from the ternary modulated data, non-ternary modulated data for transmission to a receiver, the non-ternary modulated data being in a non-ternary PSK format that comprises fewer than three modulation states or more than three modulation states; and transmitting, to the receiver, the non-ternary modulated data as light using an optical source.

Example 19. The PSK transmitter of example 18, wherein converting the ternary modulated data to the non-ternary modulated data comprises using a phase mapping to map the ternary PSK format to the non-ternary PSK format.

Example 20. The PSK transmitter of any one of examples 18 to 19, wherein the receiver is configured to sample the received light at transient time, the sampling at transient time being performed by an analog-to-digital converter in the receiver.

Example 21. A phase shift key (PSK) device, comprising: a modulator to generate ternary modulated data from binary data, the ternary modulated data being in a ternary PSK format comprising three modulation states; a converter to convert the ternary modulated data to non-ternary modulated data for transmission to a receiver, the non-ternary modulated data being in a non-ternary PSK format that comprises more than three modulation states; and a transmitter to transmit, to the receiver, the non-ternary modulated data as light using an optical source.

Example 22. The PSK device of example 21, wherein the converter converts the ternary modulated data to non-ternary modulated data using a phase mapping to map the ternary PSK format to the non-ternary PSK format.

Example 23. The PSK device of any of examples 21 or 22, wherein the receiver is a direct detection based receiver that receives the light comprising the non-ternary modulated data.

Example 24. The PSK device of any of examples 21-23, wherein the receiver is configured to sample the non-ternary modulated data at transient time.

Example 25. The PSK device of any of examples 21-24, wherein the transmitter is configured to convert the non-ternary modulated data into light using the optical source, wherein the light is transmitted to the receiver using a fiber.

Example 26. The PSK device of any of examples 21-25, wherein the modulator comprises a distribution matcher to generate the ternary modulated data from the binary data.

Example 27. The PSK device of any of examples 21-26, wherein the receiver is configured to convert the light into ternary modulated data and convert the ternary modulated data into binary data using an inverse distribution matcher.

Example 28. The PSK device of any of examples 21-27, wherein the non-ternary modulated data is transmitted to the receiver over an optical network.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A method for processing optical data using a phase shift key transmitter, the method comprising:
    identifying binary data for transmission;
    generating ternary phase shift key data from the binary data, the ternary modulated phase shift key data being in a ternary phase shift key format comprising three states;
    generating, from the ternary phase shift key data, non-ternary phase shift key data for transmission to a receiver, the non-ternary phase shift key data being in a non-ternary phase shift key format that comprises more than three states; and
    transmitting, to the receiver, the non-ternary phase shift key data as light using an optical source.

2. The method of claim 1, wherein the non-ternary phase shift key format being a quaternary phase shift key format comprising four states.

3. The method of claim 1, wherein the receiver is a direct detection based receiver that receives the light comprising the non-ternary phase shift key data.

4. The method of claim 1, wherein the receiver is configured to sample the non-ternary phase shift key data at transient time.

5. The method of claim 4, wherein sampling at transient time is performed by an analog-to-digital converter in the receiver, wherein transient time corresponds to sampling between symbol segments of the non-ternary phase shift key data.

6. The method of claim 1, further comprising:
    converting the non-ternary modulated phase shift key data into light using the optical source, wherein the light is transmitted to the receiver using a fiber.

7. The method of claim 1, wherein the ternary phase shift key data is generated from the binary data using a distribution matcher.

8. The method of claim 1, wherein the receiver is configured to convert the light into ternary phase shift key data and convert the ternary phase shift key data into the binary data using an inverse distribution matcher.

9. The method of claim 1, further comprising converting the non-ternary phase shift key data into binary data.

10. The method of claim 9, further comprising generating forward error correction binary data by applying forward error correction coding to the binary data.

11. The method of claim 10, further comprising converting the forward error correction binary data into the non-ternary phase shift key data, wherein the receiver is configured to convert the non-ternary phase shift key data into binary data and apply forward error correction decoding to the binary data.

12. The method of claim 1, wherein each of the three states of the ternary phase shift key format has non-overlapping transition curves when detected by a detector in the receiver.

13. The method of claim 1, wherein the non-ternary phase shift key data is transmitted to the receiver over an optical network.

14. A phase shift key device, comprising:
    a modulator to generate ternary phase shift key data from binary data, the ternary phase shift key data being in a ternary phase shift key format comprising three states;
    a converter to convert the ternary phase shift key data to non-ternary phase shift key data for transmission to a receiver, the non-ternary phase shift key data being in a non-ternary phase shift key format that comprises more than three states; and
    a transmitter to transmit, to the receiver, the non-ternary phase shift key data as light using an optical source.

15. The phase shift key device of claim 14, wherein the receiver is a direct detection based receiver that receives the light comprising the non-ternary phase shift key data.

16. The phase shift key device of claim 14, wherein the receiver is configured to sample the non-ternary phase shift key data at transient time.

17. The phase shift key device of claim 14, wherein the transmitter is configured to convert the non-ternary phase shift key data into light using the optical source, wherein the light is transmitted to the receiver using a fiber.

18. The phase shift key device of claim 14, wherein the modulator comprises a distribution matcher to generate the ternary phase shift key data from the binary data.

19. The phase shift key device of claim 14, wherein the receiver is configured to convert the light into ternary phase shift key data and convert the ternary phase shift key data into binary data using an inverse distribution matcher.

20. The phase shift key device of claim 14, wherein the non-ternary phase shift key data is transmitted to the receiver over an optical network.

* * * * *